United States Patent
Bonen et al.

(10) Patent No.: US 11,742,647 B2
(45) Date of Patent: *Aug. 29, 2023

(54) BRACKET FOR STAND MOUNTED OUTDOOR EQUIPMENT

(71) Applicant: Harmonic, Inc., San Jose, CA (US)

(72) Inventors: Adi Bonen, Plainsboro, NJ (US); Leon Korsunsky, San Jose, CA (US)

(73) Assignee: Harmonic, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,532

(22) Filed: Oct. 6, 2021

(65) Prior Publication Data

US 2022/0029404 A1    Jan. 27, 2022

Related U.S. Application Data

(63) Continuation-in-part of application No. 16/660,479, filed on Oct. 22, 2019, now Pat. No. 11,146,052.

(60) Provisional application No. 62/756,303, filed on Nov. 6, 2018.

(51) Int. Cl.
  *F16M 11/00*  (2006.01)
  *H02G 7/08*   (2006.01)
(52) U.S. Cl.
  CPC .................................... *H02G 7/08* (2013.01)
(58) Field of Classification Search
  CPC ....................................................... H02G 7/08
  See application file for complete search history.

(56) References Cited

U.S. PATENT DOCUMENTS

| | | | | |
|---|---|---|---|---|
| 2,637,233 A | * | 5/1953 | Hoffman | B25B 23/00 81/448 |
| 4,014,504 A | * | 3/1977 | Sachs | H02G 7/08 24/135 R |
| 4,461,521 A | * | 7/1984 | Sachs | H01R 4/646 174/44 |
| 4,526,428 A | * | 7/1985 | Sachs | H02G 7/056 24/115 R |
| 5,150,710 A | * | 9/1992 | Hall | G01R 33/28 324/318 |
| 5,163,643 A | * | 11/1992 | Auclair | F16G 11/048 248/63 |
| 5,772,455 A | * | 6/1998 | Auclair | H01R 4/42 439/100 |

(Continued)

*Primary Examiner* — Amy J. Sterling
(74) *Attorney, Agent, or Firm* — Brokaw Patent Law PC; Christopher J. Brokaw

(57) ABSTRACT

Approaches for bracket for strand mounted equipment. The bracket comprises a body having a first end and a second end opposing the first end. The first end comprises one or more resting hooks sized to be positioned over a strand. The resting hooks allow for resting the strand mounted equipment temporarily onto the strand in a position that readily accommodates the permanent attachment of the strand mounted equipment to the strand. The first end of the bracket also comprises a clamp for securing the bracket to the strand, while the second end comprises a securing mechanism for securing the bracket to the strand mounted equipment. The bracket may be formed from a single piece of shaped metal. The strand mounted equipment may be a variety of equipment, such as CATV outdoor equipment and Internet access equipment.

14 Claims, 5 Drawing Sheets

(56) References Cited

U.S. PATENT DOCUMENTS

| | | | | |
|---|---|---|---|---|
| 5,842,670 A * | 12/1998 | Nigoghosian | ........ | A45D 20/12 |
| | | | | 248/910 |
| 7,011,279 B2 * | 3/2006 | Richter | ........ | F16M 11/40 |
| | | | | 248/274.1 |
| 7,226,026 B2 * | 6/2007 | Lin | ........ | F16B 47/00 |
| | | | | 248/205.8 |
| 7,712,712 B2 * | 5/2010 | Richter | ........ | B60R 11/02 |
| | | | | 248/205.5 |
| 8,070,434 B2 * | 12/2011 | Sun | ........ | F04D 29/601 |
| | | | | 415/214.1 |
| 9,016,658 B2 * | 4/2015 | Barnard | ........ | F16M 11/40 |
| | | | | 248/688 |
| D910,160 S * | 2/2021 | Hsu | ........ | D23/382 |
| D923,773 S * | 6/2021 | Wang | ........ | D23/382 |
| 11,146,052 B1 * | 10/2021 | Bonen | ........ | H02G 7/08 |
| 2007/0170320 A1 * | 7/2007 | Sun | ........ | F04D 25/08 |
| | | | | 248/177.1 |
| 2009/0039213 A1 * | 2/2009 | Darrow | ........ | F16M 11/40 |
| | | | | 396/428 |
| 2013/0062490 A1 * | 3/2013 | Godber | ........ | F16M 13/022 |
| | | | | 248/274.1 |
| 2013/0134268 A1 * | 5/2013 | Wessells | ........ | F16M 11/16 |
| | | | | 248/157 |
| 2014/0168890 A1 * | 6/2014 | Barnard | ........ | G06F 1/1626 |
| | | | | 248/181.2 |
| 2017/0086314 A1 * | 3/2017 | Simon | ........ | F16M 11/28 |
| 2018/0119876 A1 * | 5/2018 | Smolinski | ........ | F16M 11/40 |
| 2018/0266625 A1 * | 9/2018 | Balmer | ........ | F16M 13/00 |

\* cited by examiner

BRACKET FOR STAND MOUNTED OUTDOOR EQUIPMENT

CLAIM OF PRIORITY

The present application is a continuation in part of, and claims priority to, U.S. Pat. No. 11,146,052, application Ser. No. 16/660,479, entitled "Brackets for Strand Mounting CTAV Outdoor Equipment," filed Oct. 22, 2019, issued Oct. 12, 2021, the entire disclosure of which is hereby incorporated by reference for all purposes in its entirety as if fully set forth herein.

U.S. Pat. No. 11,146,052 claims priority to U.S. Provisional Patent Application No. 62/756,303, entitled "Brackets for Strand Mounting CTAV Outdoor Equipment," filed Nov. 6, 2018, the entire disclosure of which is hereby incorporated by reference for all purposes in its entirety as if fully set forth herein.

FIELD OF THE INVENTION

Embodiments of the invention generally relate to a bracket for mounting outdoor equipment upon a strand that extends between two telephone poles.

BACKGROUND

A cable distribution network is composed of hardline coaxial cables which connect various types of Radio Frequency (RF) electronics equipment. Hardline cable taps, power inserters, splitters, and other small devices, being physically small, are typically designed such that access to the electronics contained inside is facilitated by opening a panel in the chassis (often called a "face plate"). The face plate of small devices, such as a tap, typically weighs less than one pound. Removing a one pound face plate does not present a physical challenge to the cable technician.

On the other hand, other types of outdoor cable equipment, such as a node, are often physically larger and heavier. For example, a node may weigh as much as 50 pounds. A node is typically designed as a clamshell. To gain access to the inside of the node, a cable technician must split the clamshell exterior in half. The base of the node remains mounted and is largely unmovable, while the lid of the node pivots 180° around a hinge located at the bottom of the node and attached to both parts of the clamshell exterior. Adjusting the lid in this fashion presents to the cable technician the electrical components that are mounted in both the base and the lid of the node.

Cable plant RF amplifiers, having a size and weight somewhere in between that of a tap and a node, are typically built according to either the first approach (i.e., a removable face plate) or the second (a clam shell having a lid that may be rotated to expose the interior of the clam shell), often based on the actual physical size of the amplifier.

A very large portion of the Cable TV (CATV) nodes in North America, Latin America, Central America, and other parts of the world are mounted on a stainless-steel cable strand (hereafter a "strand"), which is stretched between utility poles. Even when the cable plant is buried underground, cable plant equipment such as hardline cable taps, cable amplifiers, and nodes are often mounted in a semi-buried small enclosure. Use of a small enclosure in this fashion facilitates access to the cable plant equipment by a cable technician. In these semi-buried small enclosures, the cable plant equipment is often strand mounted on a special short strand or metal rod stretched on a special load bearing construction.

When a hardline tap (or other small cable equipment) is installed on a strand, the weight of the tap does not pose any challenge to the cable technician. A tap is typically mounted onto the strand using a simple single-bolt clamp that holds the strand between the clamp and the tap body itself. In some cases, the tap is mounted directly to the strand, relying on the rigidity of the hardline cable to securely hold the tap in place. In other cases, existing cables attached to the strand may render it difficult to attach the tap directly to the strand; in such cases, the tap may be attached to the strand using an extension bracket.

Such extension brackets are designed to provide enough distance between the tap and the strand to allow any existing cables already attached to the strand to reside between the strand and the tap. An extension bracket may be attached to the tap with a bolt used for direct strand mounting and may, but need not, also employ a tap clamp. Attaching an extension bracket to the strand is often done with a clamp built into the extension bracket.

FIG. 1 is an illustration of a tap 110 which may be mounted onto a strand with the aid of extension bracket 210 shown in FIG. 2 in accordance with the prior art. Extension bracket 210 of FIG. 2 can be secured to tap 110 of FIG. 1 using a bolt that extends through hole 220 of extension bracket 210 into location 112 of tap. Extension bracket 210 of FIG. 2 can be positioned over a strand such that the strand extends through clamp 230 of extension bracket 210. Once clamp 230 is positioned in the desired position over the strand, bolt 232 may be tightened to secure clamp 230 of extension bracket 210 in place against the strand.

Due to the low physical weight of a tap, the two physical attachments (i.e., the extension bracket to the tap and the extension bracket to the strand) can be done at either order as preferred by the cable technician. The orientation of the tap after installation has some flexibility, since the tap weight does not present a significant force to the strand. Thus, it is not challenging for a cable technician to orient the extension bracket in a direction that does not interfere with the existing cables attached to the strand while allowing easy access to the face plate of the tap. Cable amplifiers are often mounted in a similar way to hardline taps, although two clamps may be used at two different locations to provide additional mounting stability.

Mounting a node upon a strand typically involves attaching the node to the strand using clamps at two different mounting points to provide stability to the node, prevent lateral swinging of the node, and spread the weight of the node across the two load bearing clamps. The node may be attached directly to the strand. In such a case, a bolt can be used to attach each of two clamps to cause the strand to be clamped between the clamp and the node housing. Alternately, the node may be attached indirectly to the strand using a bracket that allows some distance between the node and the strand. Using a bracket is typically necessary when there are existing cables already attached to the strand. Any existing cables already attached to the strand may be rather old. Applying force sufficient to move the existing cables aside to allow for direct node strand mounting may damage those existing cables; using a bracket allows for the node to be secured to the strand while the existing cables remain in place.

A node often weighs around 50 pounds or more; given this weight, installing a node presents a considerable challenge to a single installer. If the node is mounted at an angle, then the weight and size of the node will apply a strong moment of force to the strand, which causes the strand to rotate until the node is directly underneath the strand. This situation is not desirable since it applies stress to the strand and to any cables attached to it. The resulting stress placed upon existing cables may damage them, and this situation should be avoided.

A strand upon which a node is to be mounted is about 20 feet off the ground. Mounting the node to a strand is typically performed with the aid of one or two hydraulic bucket trucks that raise the installers, the node, and any other required equipment to the height of the strand. The weight of the node often requires that multiple installers work together to raise the node, maneuver the node to the strand, and clamp the node to the strand. When brackets are used to mount the node slightly away from the strand, the brackets are always attached to the node first, and then the node with the brackets attached is lifted and affixed to the strand. The combination of the physical strength required to hold the node in position for strand mounting, and the fine motion of placing the clamps and the strand in the correct place and attaching and tightening the bolts, often makes it necessary for several installers to cooperate when mounting the node to a strand.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a bracket for strand mounted equipment are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Embodiments of the invention are directed towards a bracket for strand mounted equipment. The bracket of an embodiment enables an installer of strand mounted equipment to install the equipment with less physical effort and with greater ease than prior approaches. Another benefit is that the bracket of an embodiment reduces the risk of damage occurring to the installed strand mounted equipment or to any existing cables already mounted on a stand.

Brackets of an embodiment advantageously possesses resting hooks which allow for resting the strand mounted equipment temporarily onto a strand in a position that readily accommodates the permanent attachment of the strand mounted equipment to the strand via the bracket.

Embodiments may be used with a variety of different types of strand mounted equipment. Examples of strand mounted equipment include CATV outdoor equipment and Internet access equipment. As another example, embodiments may be used to mount the following types of devices to a stand: cable television devices, passive optical network (PON) devices, optical line terminal (OLT) devices, Ethernet switching devices, and wireless devices (such as Wi-Fi and Citizens Broadband Radio Service (CBRS)). For purposes of providing a concrete example, certain examples will be explained with reference to stand mounted CATV equipment, although those in the art shall appreciate a variety of strand mounted equipment may be used with embodiments of the invention.

Figure 1:
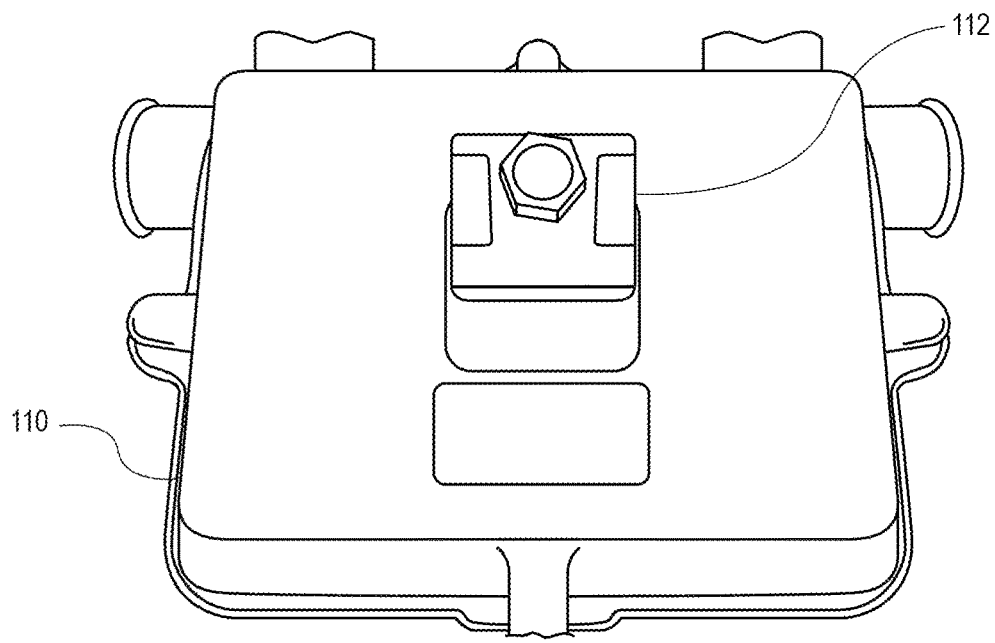
FIG. 1 is an illustration of a tap which may be mounted onto a strand with the aid of a bracket in accordance with the prior art.
Figure 2:
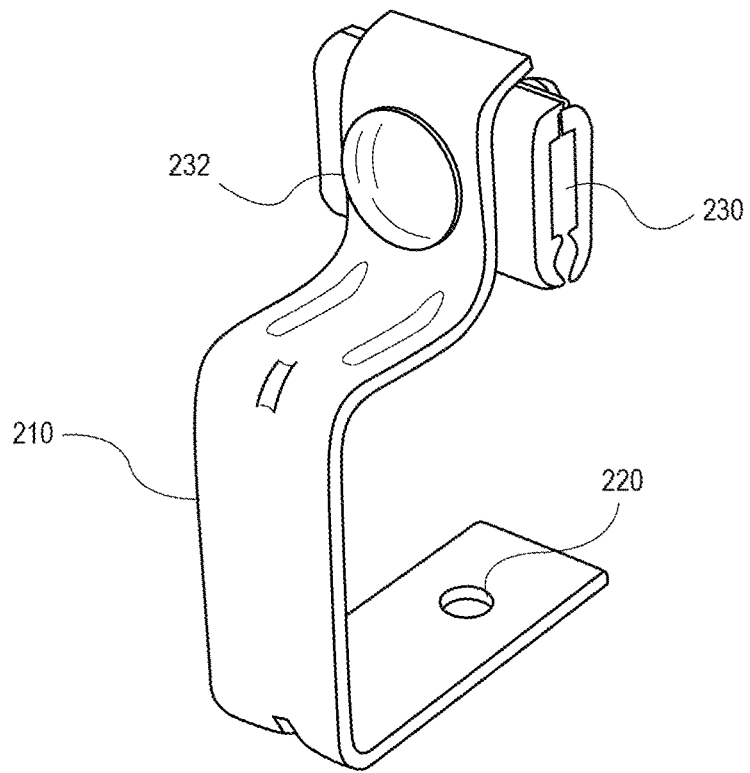
FIG. 2 is an illustration of a bracket usable in mounting a tap or node to a strand according to the prior art.
Figure 3A:
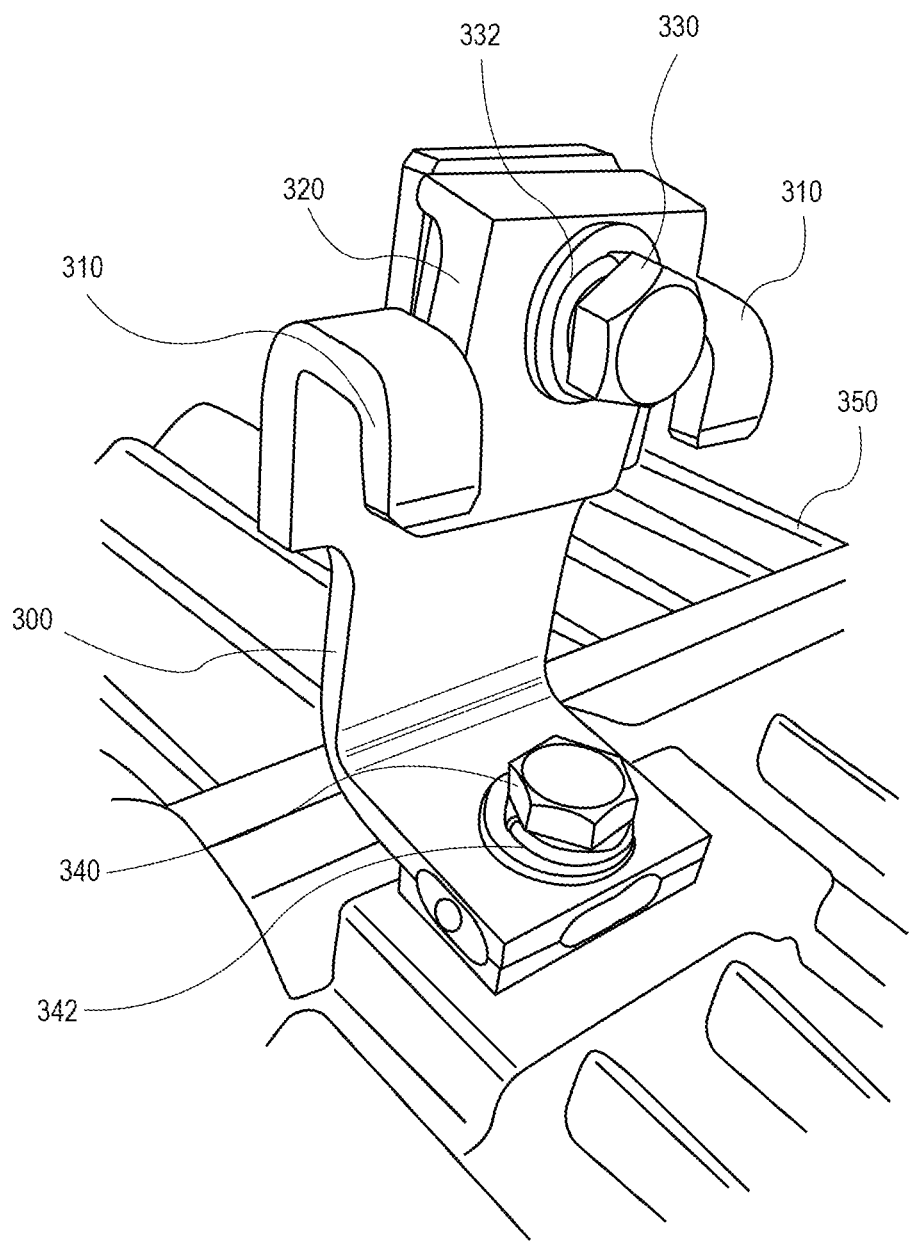
FIG. 3A is an illustration of a perspective view of a bracket for strand mounted CATV outdoor equipment according to an embodiment of the invention.

FIG. 3A is an illustration of a perspective view of bracket 300 for strand mounted CATV outdoor equipment according to an embodiment of the invention. Bracket 300 has a body that possesses one or more resting hooks 310 at one end. One or more resting hooks 310 are sized to be positioned over a strand. At the same end as the one or more resting hooks 310, bracket 300 also comprises a clamp 320 for securing bracket 300 to the strand. Clamp 320 may be secured in place by bolt 330 or other securing means which runs through an aperture 332 in bracket 300. Aperture 332 of bracket 300 may be a threaded aperture to capture bolt 330. Alternatively, nut 333 (shown in FIG. 3D) may be welded to bracket 300 behind aperture 332 to accept bolt 330. The other end of bracket 300 comprises an aperture 342 which may be used to secure bracket 300 to CATV outdoor equipment using bolt 340 or other securing means.

Figure 3C:
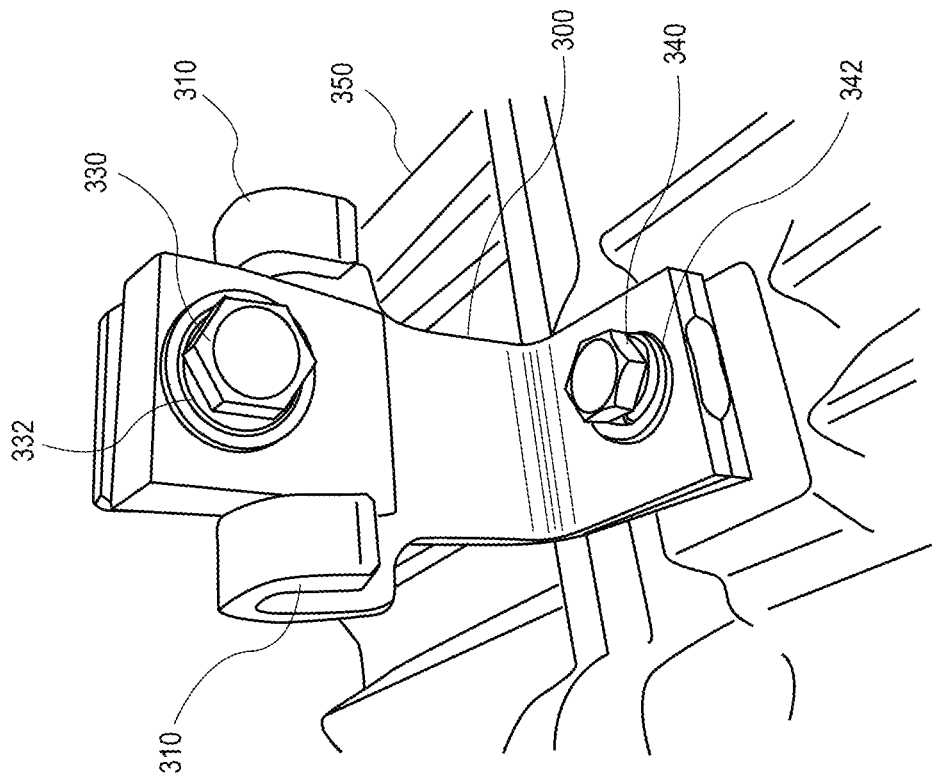
FIG. 3C is an illustration of a perspective view of a bracket affixed to CATV outdoor equipment according to an embodiment of the invention.
Figure 3B:
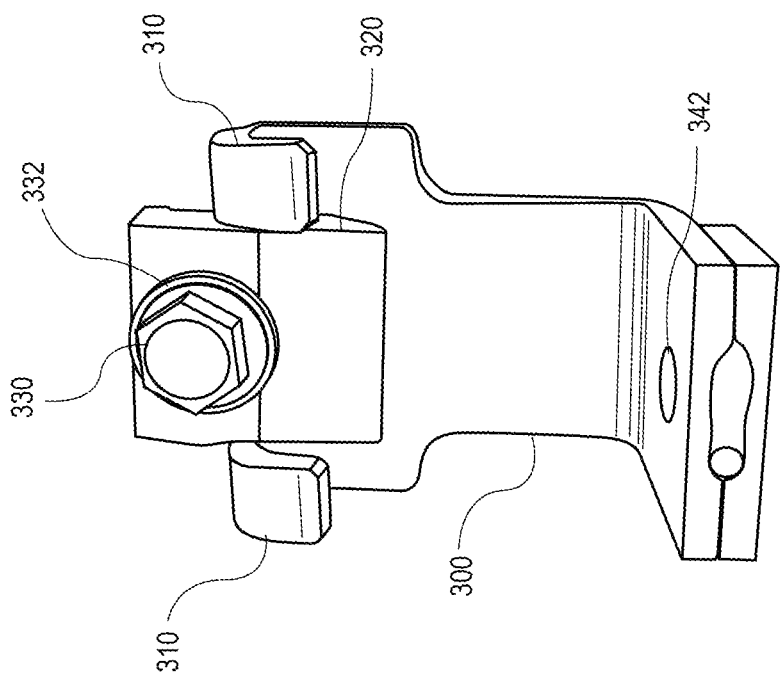
FIG. 3B is an illustration of a front view of a bracket affixed to CATV outdoor equipment according to an embodiment of the invention.
Figure 3D:
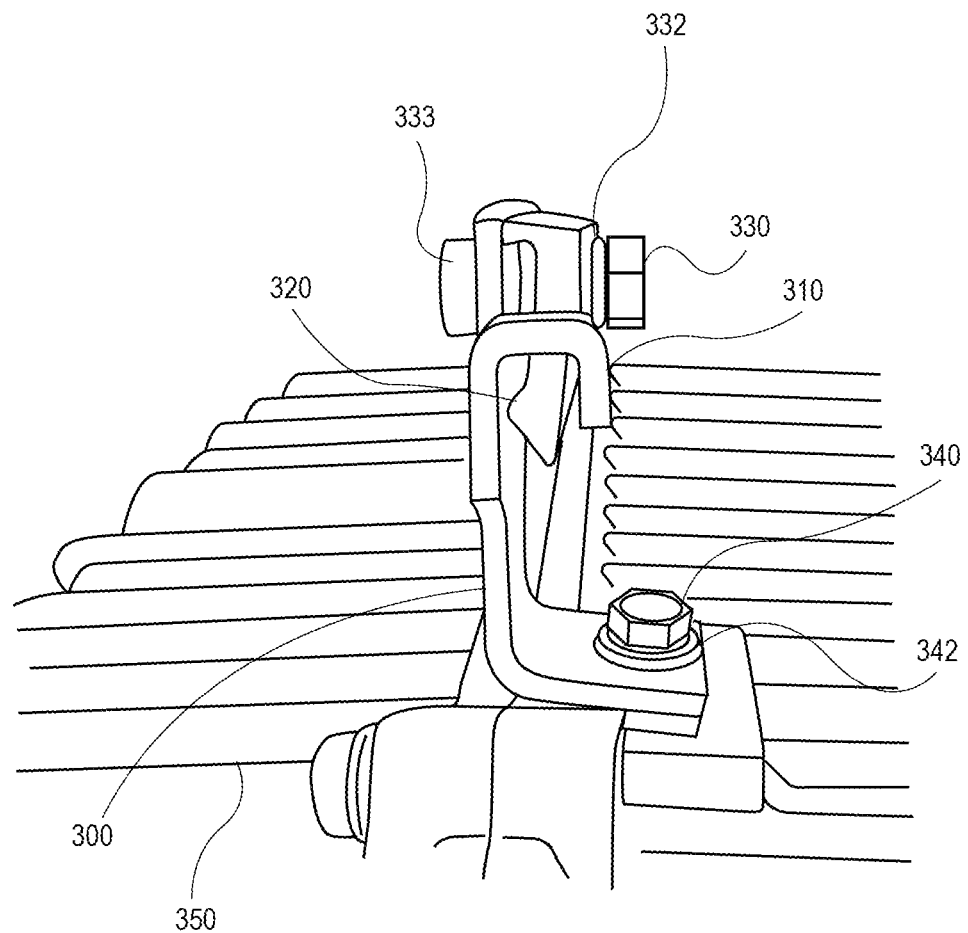
FIG. 3D is an illustration of a side view of a bracket affixed to CATV outdoor equipment according to an embodiment of the invention.

FIGS. 3B-D illustrate a front view of bracket 300 affixed to CATV outdoor equipment 350, a perspective view of bracket 300 affixed to CATV outdoor equipment 350, and a side view of bracket 300 affixed to CATV outdoor equipment 350 respectively according to an embodiment of the invention. CATV outdoor equipment 350 shown in FIGS. 3B-D broadly represents any type of CATV outdoor equipment which may be secured to a strand, such as but not limited to a cable tap, a power inserter, a splitter, a RF amplifier, and a node.

Bracket 300, as shown in FIG. 3A-D, is designed to ease the strand mounting process for the installer. The installer lifting CATV outdoor equipment 350, such as a heavy node, does not need to continue and hold CATV outdoor equipment 350 in place relative to the strand while a second installer attaches and tightens clamp 320 with bolt 330. Instead, brackets 300 are affixed to CATV outdoor equipment 350 with clamp 320 disassembled and removed from the extension bracket. CATV outdoor equipment 350 is maneuvered such that resting hooks 310 are positioned above the strand and CATV outdoor equipment 350 is eased down such that the strand engages into resting hooks 310 and the weight of CATV outdoor equipment 350 completely rests through the resting hooks 310 on the strand. CATV outdoor equipment 350 is now held safely enough to enable the installer to let go of CATV outdoor equipment 350 completely. Gravity positions CATV outdoor equipment 350 directly below the strand without applying any moment on the strand and without stressing any existing cables attached to the strand.

By using an embodiment of the invention, the same single installer can now position clamp 320 and bolt 330 and tighten bolt 330 without having to bear the weight of CATV outdoor equipment 350 while doing so. Once bolt 330 is tightened, mounting CATV outdoor equipment 350 to the strand is complete.

Bracket 300 may be manufactured from a single piece of sheet metal. A single piece of sheet metal may be cut and bent to the form and shape of bracket 300, including one or more resting hooks 310. As a result, bracket 300 may be manufactured from low cost material and using a low-cost manufacturing process. Bracket 300 may also be manufactured using a die cast process to achieve an even lower cost.

Figure 4:
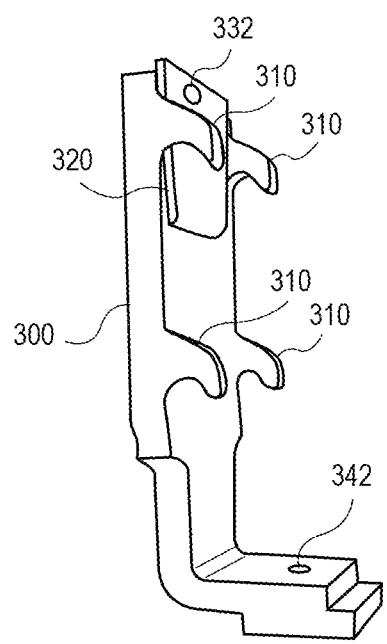
FIG. 4 is an illustration of bracket having multiple rows of resting hooks according to an embodiment of the invention.

FIG. 4 is an illustration of bracket 300 having multiple rows of resting hooks 310 according to an embodiment of the invention. Bracket 300 shown in FIG. 4 possess multiple mounting positions that can be used, thus enabling an installer to mount CATV outdoor equipment 350 in different optional distances away from the strand as needed. For example, a shorter mounting distance can be used when a single existing cable is attached to the strand, and a longer mounting distance can be used when the installer has to maneuver around multiple existing cables or a very large existing cable.

Bracket 300 and clamp 320 may be designed such that the clamp that is used for direct attachment of CATV outdoor equipment 350 to the strand is alternatively used to attach bracket 300 to the strand when bracket mounting is needed, thus saving in mounting accessories cost. Thus, in embodiments, bracket 300 may be embodied as an extension bracket.

Figure 5:
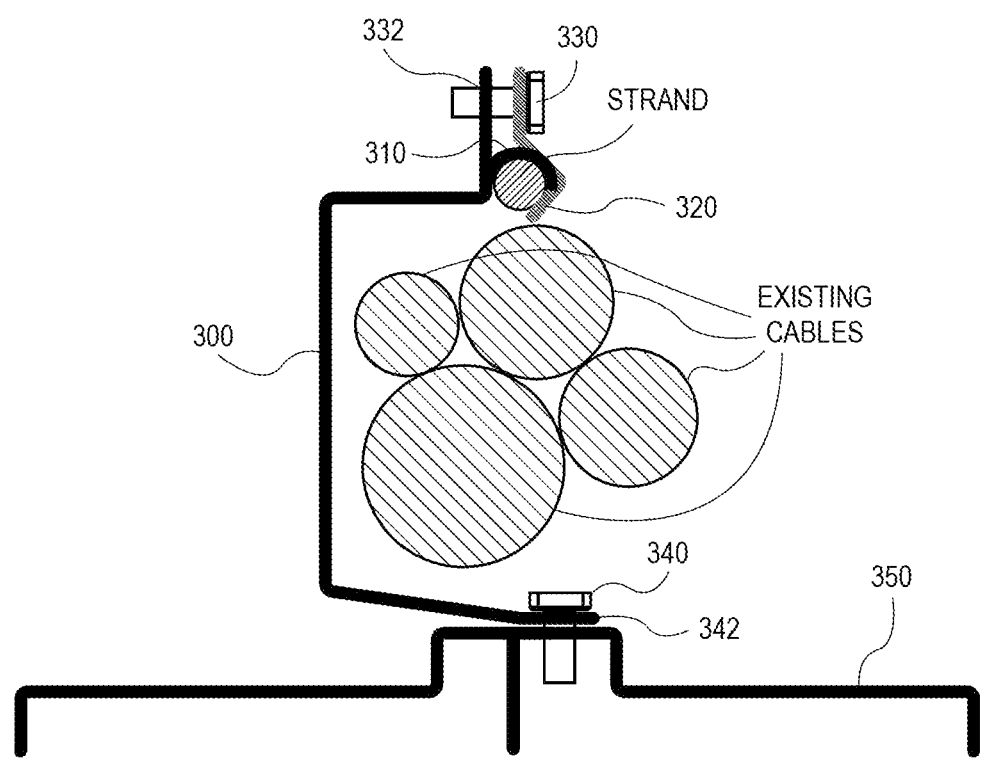
FIG. 5 is an illustration of extension bracket having a C-shape according to an embodiment of the invention.

FIG. 5 is an illustration of extension bracket 300 having a C-shape according to an embodiment of the invention. The extension bracket 300 shown by the embodiment of FIG. 5 is designed with resting hooks 310 above a large C-formed sheet metal curve to enable CATV outdoor equipment 350 to be attached to a strand with an existing large number of big cables, which may be positioned in the cavity formed by the C-shape body of extension bracket 300 as shown by FIG. 5.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A bracket for strand mounted equipment, comprising:
   the bracket comprising a body having a first end and a second end opposing the first end,
   wherein said first end comprises one or more resting hooks sized to be positioned over a strand, wherein said first end comprises a clamp for securing the bracket to the strand, and
   wherein the second end comprises a securing mechanism for securing the bracket to the strand mounted equipment.

2. The bracket of claim 1, wherein the clamp is secured by a bolt.

3. The bracket of claim 1, wherein the first end and the second end of the body are approximately vertically aligned upon securing the strand mounted equipment to the strand.

4. The bracket of claim 1, wherein the bracket is formed from a single piece of shaped metal.

5. The bracket of claim 1, wherein the bracket is formed from a single piece of die cast metal.

6. The bracket of claim 1, wherein the body of the bracket is C-shaped and sized to be positioned around one or more cables attached to said strand.

7. The bracket of claim 1, wherein the body of the bracket comprises one or more additional resting hooks in addition to the one or more resting hooks at the first end of the body, and wherein the one or more additional resting hooks allow for the strand mounted equipment to be positioned at a different distance beneath the strand than said one or more resting hooks at the first end of the body.

8. The bracket of claim 1, wherein the body of the bracket comprises one or more bends which are approximately perpendicular.

9. The bracket of claim 1, wherein the clamp is disposed between two separate resting hooks of said one or more resting hooks.

10. The bracket of claim 1, wherein the strand mounted equipment is CATV outdoor equipment.

11. The bracket of claim 1, wherein the strand mounted equipment is Internet access equipment.

12. The bracket of claim 1, wherein the strand mounted equipment is a passive optical network (PON) device.

13. The bracket of claim 1, wherein the strand mounted equipment is an Ethernet switching device.

14. The bracket of claim 1, wherein the strand mounted equipment is a wireless device.

\* \* \* \* \*